United States Patent [19]
Baughn et al.

[11] Patent Number: 6,089,344
[45] Date of Patent: Jul. 18, 2000

[54] METHOD AND APPARATUS FOR DETERMINING THE CENTER POSITION OF A STEERING SYSTEM

[75] Inventors: Bernard Dale Baughn, Livonia; John Robert Grabowski, Dearborn; Ross Maxwell Stuntz, Birmingham, all of Mich.

[73] Assignee: Ford Global Technologies, Inc., Dearborn, Mich.

[21] Appl. No.: 09/088,792

[22] Filed: Jun. 1, 1998

[51] Int. Cl.⁷ .................................................. B62D 5/04
[52] U.S. Cl. ........................... 180/446; 180/422; 701/41
[58] Field of Search ..................... 180/443, 444, 180/445, 446, 417, 421, 422, 423; 701/41, 42

[56] References Cited

U.S. PATENT DOCUMENTS

| | | |
|---|---|---|
| 4,621,833 | 11/1986 | Soltis . |
| 4,722,545 | 2/1988 | Gretz et al. . |
| 4,803,629 | 2/1989 | Noto et al. . |
| 4,856,607 | 8/1989 | Sueshige et al. ................. 180/422 |
| 4,867,466 | 9/1989 | Soltis . |
| 4,961,474 | 10/1990 | Daido et al. . |
| 4,999,776 | 3/1991 | Soltis et al. . |
| 5,032,996 | 7/1991 | Shiraishi . |
| 5,065,323 | 11/1991 | Shiraishi et al. . |
| 5,121,322 | 6/1992 | Shiraishi et al. . |
| 5,243,188 | 9/1993 | Hattori et al. . |
| 5,253,172 | 10/1993 | Ito et al. . |
| 5,311,432 | 5/1994 | Momose . |
| 5,422,810 | 6/1995 | Brunning et al. . |
| 5,434,784 | 7/1995 | Bradley et al. . |
| 5,465,210 | 11/1995 | Walenty . |
| 5,732,372 | 3/1998 | Marsden ................................ 701/41 |

*Primary Examiner*—Kevin Hurley

[57] ABSTRACT

A method and apparatus for determining a center position of the vehicular steering system includes a vehicle speed sensor, a steering sensor and a control unit. The control unit uses a strategy to determine an estimate of the steering assist force. When the steering assist force is below a force threshold and a vehicle speed is above a speed threshold, the controller filters data from the steering sensor so as to rapidly determine a precise center position for the steering system.

10 Claims, 3 Drawing Sheets

METHOD AND APPARATUS FOR DETERMINING THE CENTER POSITION OF A STEERING SYSTEM

TECHNICAL FIELD

This invention relates to a method and apparatus for determining the center position of a vehicular steering system. This method and apparatus are particularly useful for controlling an electro-hydraulic power assist steering system.

BACKGROUND OF THE INVENTION

It is known in the art to use steering sensors for controlling steering systems and suspension systems. Sensors of the fixed center type are prone to failure due to mis-adjustment of the sensor inasmuch as precise angular measurements must be obtainable from such sensors if they are to be useful in providing rapid response to a steering system event. These sensors must be installed and calibrated correctly at the time the vehicle is manufactured as well as requiring re-calibration whenever the steering system geometry is changed. The steering system geometry may be changed while the vehicle is in use, necessitating service to to calibrate the steering sensor.

To avoid these problems, relative steering sensors have been developed that are capable of measuring relative motion of the steering system, however, they must determine the actual or true center position of the steering system each time the vehicle is operated. Such a steering sensor is disclosed in U.S. Pat. No. 4,722,545, which is assigned to the assignee of the present invention. That system uses a software program in which steering center position is determined through the use of a variable sample time detection scheme operating with variably sized circumferential window zones of operation of a steering shaft. Because the sampling process associated with the algorithm of U.S. Pat. No. 4,722,545 cannot determine whether there are forces being applied to the steering system, the algorithm disclosed therein may be slow to converge on an accurate center position, especially when the vehicle is operated in nearly continuous, constant radius circles.

It would be desirable to provide a method and apparatus capable of rapidly determining an accurate or true center position of a steering system without requiring the expense and complexity of a fixed steering sensor.

SUMMARY OF THE INVENTION

In accordance with the present invention, a method for determining the center position of a vehicular steering system comprises the steps of: establishing a vehicle velocity and generating a vehicle velocity signal; estimating a steering assist force and generating a steering assist force signal; sensing an instantaneous steering system position and generating an instantaneous steering system position signal; filtering the instantaneous steering wheel position signal when both the vehicle velocity signal exceeds a velocity threshold and the steering assist force signal is less than a force threshold so as to determine a new center position of the vehicular steering system; and updating a current center position with the new center position resulting from the filtering.

According to the present invention, an apparatus for determining the center position of a vehicular steering system includes vehicle velocity sensor for establishing a vehicle velocity and generating a vehicle velocity signal. A steering sensor is also included for sensing an instantaneous steering system position and generating an instantaneous steering system position signal. A force estimator is included for estimating a steering assist force and generating a steering assist force signal. A processor operatively connected to the vehicle velocity and steering sensor and force estimator filters the instantaneous steering wheel position signal when both the vehicle velocity signal exceeds a velocity threshold and the steering assist force signal is less than a force threshold. The processor determines a new center position of the vehicular steering system and updates a current center position with the new center position.

It is an object of the present invention to provide a method and apparatus for determining the center position of the steering system which will rapidly determine the true center position.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
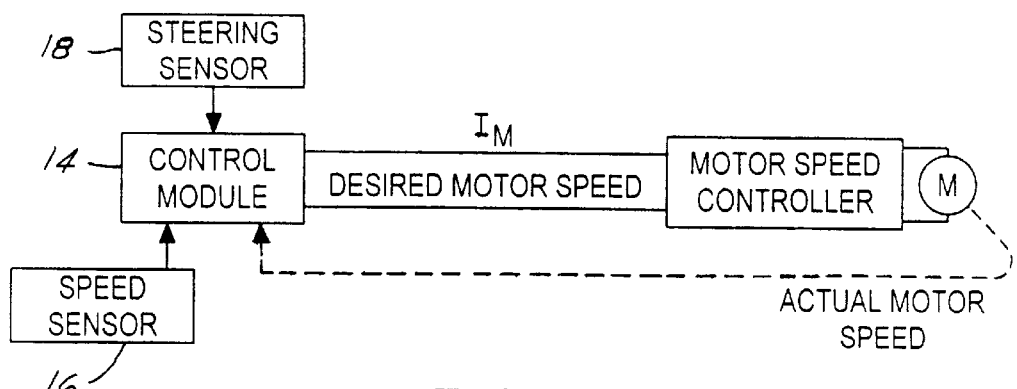
FIG. 1 shows a schematic block diagram of a control system in accordance with the present invention.

As shown in FIG. 1, the method and apparatus of the present invention is part of an electro-hydraulic power assist steering system which uses an electric motor 12 to drive a hydraulic pump, which in turn produces the system pressure used to move the steering rack. The pump flow is continuously varied, preferably every millisecond, by control of the speed of the electric motor. The pump flow is varied in response the instantaneous position of the steering wheel with respect to a calculated center position, also referred to as the absolute steering wheel angle.

Those skilled in the art will appreciate in view of this disclosure that a system according to the present invention could be utilized to control not only a steering system, but also adjustable suspension units, such as dampers, springs or stabilizer bar systems as well as various aspects of vehicle braking systems.

The component parts of a system according to the present invention are shown in FIG. 1. Accordingly, control module 14 receives inputs from speed sensor 16, steering sensor 18, and motor current, $I_M$, and motor speed, $\omega_M$, from the motor speed controller 20. In return, the control module outputs a desired motor speed, calculated using the absolute steering wheel position, to the motor speed controller 20. Those skilled in the art will appreciate in view of this disclosure that the processor within the control module and its associated peripheral equipment could be structured according to several different architectures. In a preferred embodiment, however, the processor is configured so that a control program is sequentially read for each unit command from a read-only memory (ROM) which stores preset control programs. Unit commands are executed by a central processing unit (CPU). The processor integrally includes an input-output control circuit (I/O) for exchanging data with external devices and a random access memory (RAM) for temporarily holding data while the data are being processed.

Figure 4:
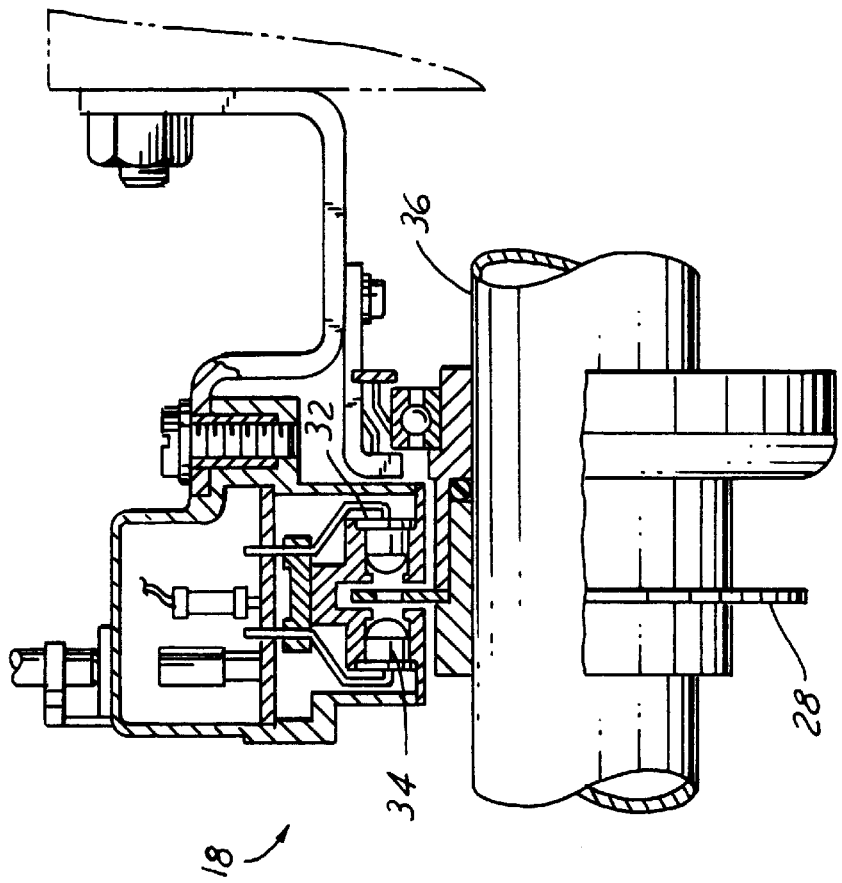
FIG. 4 is a cross sectional view of the steering sensor of the present invention taken along the line 4—4 of FIG. 3.
Figure 3:
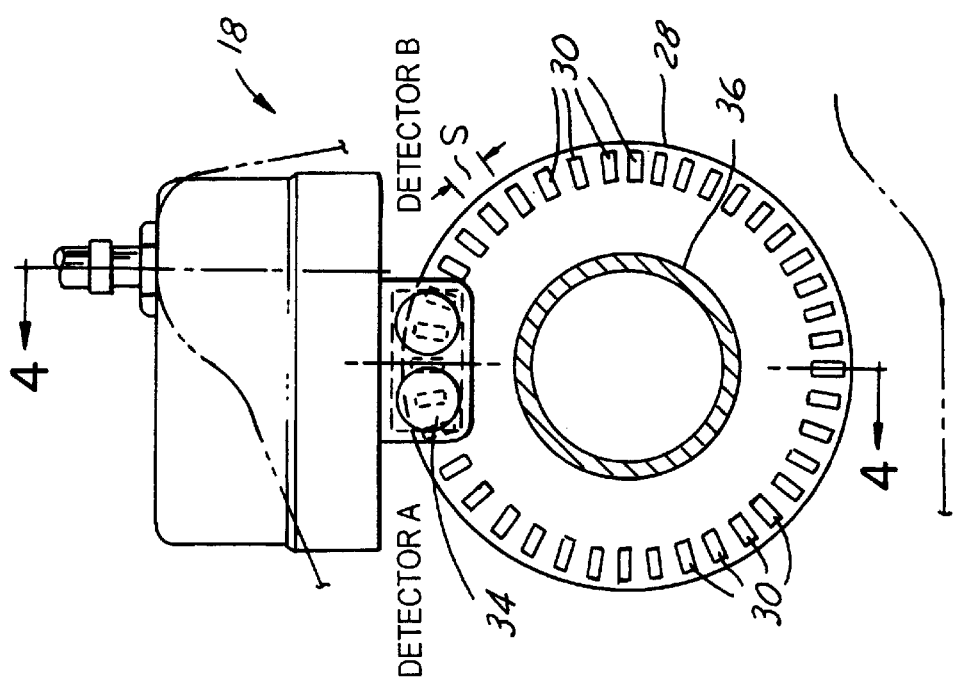
FIG. 3 is a plan view, partially cut away, of a steering sensor comprising a component part of a center finding system according to the present invention.

Steering sensor 18 includes means for measuring the absolute steering position, which represents the anugular excursion of the steering wheel from a center position, which is determined by the steering sensor in conjunction with the control module and means. As shown in FIGS. 3 and 4, steering sensor 18 comprises shutter wheel 28, attached to steering shaft 36, which shaft rotates in unison with the steering wheel as the steering wheel is turned by the driver of the vehicle. Shutter wheel 28 has a plurality of apertures 30, in this case 40 in number, which apertures serve to trigger the activity of detectors A and B as the shutter wheel is rotated with the steering system of the vehicle. Because there are 40 apertures contained within shutter wheel 28, the steering sensor provides a signal 80 times during one revolution of the steering wheel and as a result each of the 80 signals or steps indicates 4.5° of rotation of the steering system. Those skilled in the art will appreciate that to attain greater control accuracy, a shutter having a greater number of apertures could be used. This considerably increases the resolution and correspondingly the precision of the sensor.

Figure 5A:
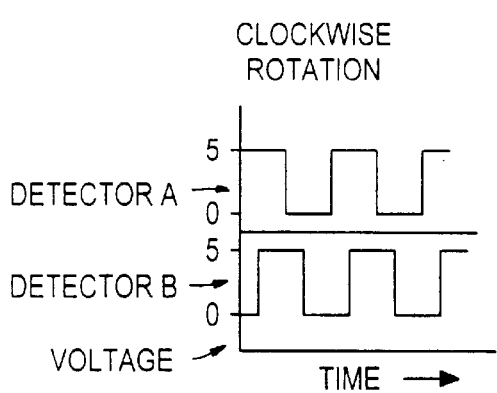
FIG. 5A illustrates the output wave forms of the detectors employed in the steering sensor illustrated in FIGS. 3 and 4 for clockwise rotation.

As shown in FIG. 4, each of detectors A and B includes a light emitting diode (LED), 32 and a photo diode, 34. The combination of the LED and photo diode is used to detect movement of shutter wheel 28 and, hence, the steering system. This is possible because the photo diodes have two states-i.e., they are bistable. A conducting state occurs whenever light from the paired LED passes through an aperture 30 in the shutter wheel and impinges upon the photo diode. The output of the detector circuit then rises to approximately 5 volts. A non-conducting state exists whenever the shutter wheel blocks the transmission of light between the LED and the photo diode. As shown in FIG. 5A, clockwise rotation of shutter wheel 28 produces a wave form pattern for the detectors in which detector A undergoes its transition prior to detector B. In other words, detector A leads detector B.

Figure 5B:
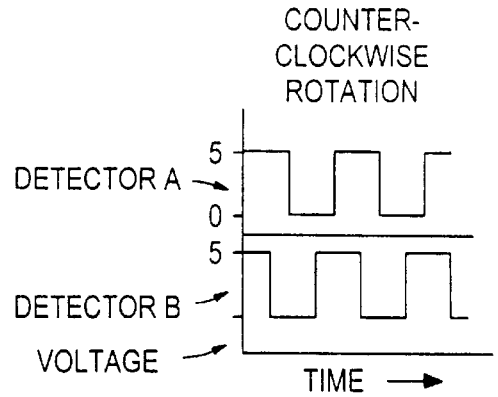
FIG. 5B illustrates the output wave forms of the detectors employed in the steering sensor illustrated in FIGS. 3 and 4 for counterclockwise rotation.

On the other hand, as shown in FIG. 5B, counterclockwise rotation of the steering sensor produces a wave form pattern for the detectors in which detector A undergoes its transition after detector B and detector A thus lags detector B. The outputs of detectors A and B are fed into the control module and in this manner control module 14 is allowed to track the direction of the steering system's rotation.

Figure 6:
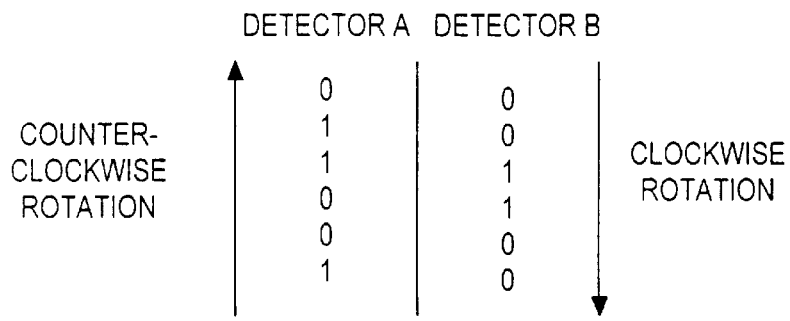
FIG. 6 is a truth table illustrating the outputs of detectors A and B illustrated in FIGS. 3–5 as the steering sensor of the present invention is rotated counterclockwise and clockwise.

FIG. 6 is a tabulation of the wave forms shown in FIGS. 5A and 5B in a digital format. In conventional fashion, the approximately 5 volts maximum output of the detectors is treated as a logical "1", while the zero output state is treated as a logical "0". FIG. 6 shows each of the possible logic pair states which could be output by detectors A and B. The pairs are arranged in the order in which they will be received by control module 14 for both counterclockwise and clockwise rotation. As seen in FIG. 6, counterclockwise rotation is read from the bottom of the figure to the upper part of the figure with clockwise rotation being read from the top of the tabulation to the lower part of the tabulation.

The output of detectors A and B is further processed by control module 14 to yield a signal indicating the steering system speed or angular velocity. This operation is performed quite simply by merely tracking the number of transitions of one or both detectors during a given unit of time. The number of such transitions during the sampling period will be directly proportional to the angular speed of the steering system.

Figure 2:
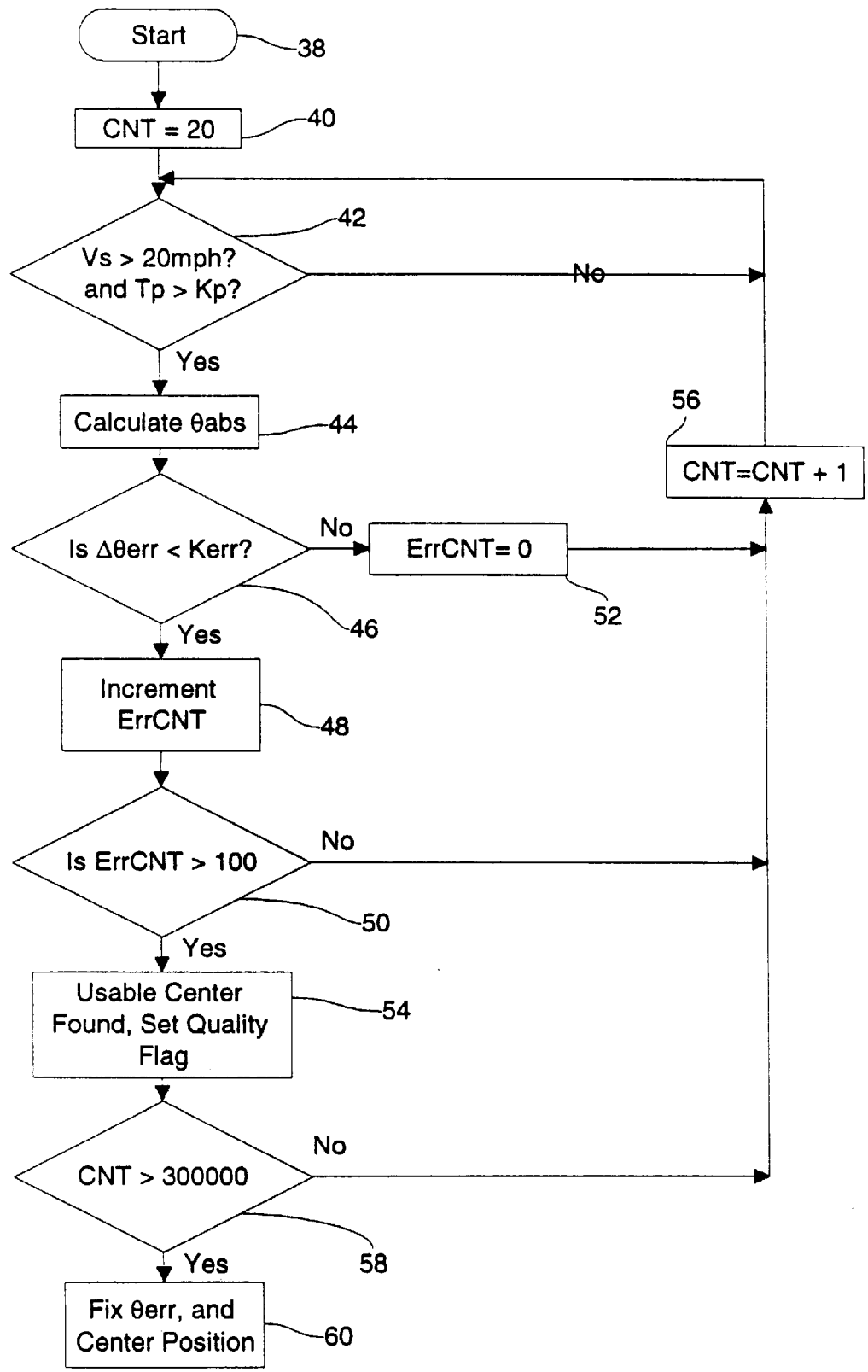
FIG. 2 contains a logic flow block diagram in accordance with an embodiment of this invention.

As previously noted, FIG. 2 comprises a logic flow block diagram in accordance with an embodiment of this invention. Beginning at start block 38 of the logic flow diagram, the processor within control module 14 transfers to block 40 and a loop counter, CNT, is initialized at a predetermined value, which in the presently preferred embodiment is 20. The processor then transfers to block 42 where two conditions are evaluated to determine if the data being generated by the steering system can be used to rapidly and accurately find the center position of the steering system.

The first condition is that the vehicle velocity, $V_S$, must exceed a speed threshold, which in the presently preferred embodiment is set at 20 mph. The second condition involves evaluating an estimate of the steering forces applied to the steering rack and ensuring that the processor only proceeds when the estimated steering assist force is below a predetermined force threshold. Advantageously, the present invention provides an estimated steering rack force signal without requiring additional sensors beyond those already required for steering system operation. It has been determined through experimentation that the pump load on the electric motor 12 can be related directly to the forces on the steering rack. Therefore, the present invention evaluates the pump load signal, $T_p$, to determine when it is below a pump load threshold, $K_P$ before the processor proceeds to block 44. The pump load signal, $T_p$, is determined according to the according to the following calculation:

$$T_P = I_M K_T - Jw'_M - D\omega_M$$

Where:

$T_P$=Pump load on motor (Nm);

$I_M$=Motor current (amps);

$\omega_M$=Motor speed (rad/sec);

$K_T$=Motor constant (Nm/amp);

J=Motor rotor moment of inertia (Kgm$^2$);

$w'_M$=Motor acceleration (rad/sec$^2$); and

D=Motor damping and windage.

The processor gets the pump motor speed and current from the motor speed controller 20. Once these two conditions are satisfied, the processor proceeds to block 44, where the steering position data is filtered to determine the center position.

At block 44 the processor calculates an absolute steering position, $\theta_{ABS}$, which is determined by subtracting a calculated error, $\theta_{ERR}$, from an instantaneous steering position, $\theta_{SW}$, acquired from the steering sensor 18. The calculated error, $\theta_{ERR}$, represents the difference between the steering position at vehicle start-up and the true steering center position. So, if the vehicle were started with the wheels pointed straight, the calculated error would be zero and the absolute steering position, $\theta_{ABS}$, would equal the instantaneous steering position, $\theta_{SW}$. The processor calculates absolute steering position, $\theta_{ABS}$, according to the following calculation:

$$\theta_{ABS(N)}=\theta_{REL(N)}-[(\theta_{ERR(N-1)}((CNT-1)/CNT)+\theta_{REL(N)}/CNT]$$

Where:
$\theta_{ABS(N)}$=Asolute steering position;
$\theta_{REL(N)}$=Instantaneous steering position;
$\theta_{ERR(N-1)}=\theta_{REL(N-1)}-\theta_{ABS(N-1)}$;
N=current pass;
N−1=previous pass; and
CNT=loop counter.

From this calculation, the processor gets a new, or updated, absolute steering position, $\theta_{ABS(N)}$. However, before this can be used as a control input parameter, the processor performs a quality analysis at block 46.

At block 46, the processor calculates the numerical differential of the calculated error, $\Delta\theta_{ERR}$, by dividing the difference of the latest two values of the calculated error, $\theta_{ERR}$, by a value representative of a time step for a single pass through the loop. The result is compared to an error threshold, $K_{ERR}$. Blocks 46, 48, 50 and 52 require that $\Delta\theta_{ERR}$ is less than the error threshold for 100 consecutive passes before declaring the absolute steering position, $\theta_{ABS}$, good enough to be used. When this happens, the processor, at block 54 switches a quality flag to indicate that a usable center position has been found and that the resultant absolute steering position, $\theta_{ABS}$, can be used for control purposes.

Specifically, each time $\Delta\theta_{ERR}$ is less than the error threshold, the processor proceeds from block 46 to block 48 and increments a counter, ErrCNT, and checks, at block 50 whether the counter has reached 100, or any other value established through testing that provides the degree of confidence necessary for a given control system. If the counter has not reached 100, the processor proceeds back to block 42, incrementing CNT at block 56. Referring back to block 46, if $\Delta\theta_{ERR}$ is greater than the error threshold, the processor proceeds to block 52 where the error counter, ErrCNT, is reset. Again, the processor proceeds back to block 42, incrementing CNT at block 56. Even though the processor has determined the absolute steering position can be used for control purposes, as indicated at block 54, the processor continues to improve the precision of the absolute steering position until the processor determines at block 58 that the loop counter, CNT, exceeds a loop counter threshold, which in the present invention is set at 300000. When this occurs, the processor proceeds to block 60 and fixes the center position by fixing the calculated error, $\theta_{ERR}$, at the latest value and terminates further execution of the algorithm until the next time the vehicle is started.

Various modifications and variations will no doubt occur to those skilled in the arts to which this invention pertains. For example, the particular sensors used in conjunction with the disclosed system may be varied from those herein in order to allow implementation on hydraulic or fully electronic power assist steering systems. A hydrualic pressure sensor could provide feedback as to the force being applied to the rack and used in the same manner as the motor current, $I_M$, described above in the presently preferred embodiment. Additionally, the system may be operated with changes to the numerical value of the various thresholds and other constants described above while remaining within the calculational scheme described herein. These and all other variations which basically rely on the teachings to which this disclosure has advanced the art are properly considered within the scope of this invention as defined by the appended claims.

What is claimed is:

1. A method for determining a current center position of a steering system installed in a vehicle, which comprises the steps of:

establishing a vehicle velocity and generating a vehicle velocity signal;

estimating a steering assist force and generating a steering assist force signal;

sensing an instantaneous steering position and generating an instantaneous steering position signal;

determining a new center position of said vehicular steering system as a function of said instantaneous steering position signal when both said vehicle velocity signal exceeds a velocity threshold and said steering assist force signal is less than a force threshold;

incrementing a loop counter each time said determining step is performed until said loop counter exceeds a loop counter threshold; and updating the current center position with the new center position when said loop counter exceeds said loop counter threshold.

2. A method according to claim 1 wherein said step of estimating a steering assist force comprises monitoring a motor current and a motor speed of a variable-speed electrical motor used for pumping hydraulic fluid in the steering system and calculating a pump load that is related to said steering assist force and generating a pump load signal therefrom.

3. A method according to claim 1, further comprises the steps of:

calculating a differential of a calculated error; and comparing said differential of the calculated error to an error threshold and declaring said center position useful when said differential of the calculated error is less than said error threshold for a predetermined number of consecutive iterations.

4. A method for determining a center position of a steering system installed in a vehicle, which comprises the steps of:

establishing a vehicle velocity and generating a vehicle velocity signal;

monitoring a motor current supplied to an electrical motor in the vehicular steering system and generating a motor current signal;

monitoring a motor speed supplied to an electrical motor in the vehicular steering system and generating a motor speed signal;

calculating a pump load using said motor current and speed signals and generating a pump load signal therefrom;

sensing an instantaneous steering position and generating an instantaneous steering position signal;

determining a center position of said vehicular steering system as a function of said instantaneous steering position signal when both said vehicle velocity signal exceeds a velocity threshold and said pump load signal is less than a pump load threshold.

5. A method according to claim 4, further comprises the step of incrementing a loop counter each time said filtering step is performed until said loop counter exceeds a loop counter threshold, afterwhich said center position becomes fixed.

6. A method according to claim 4, wherein said electrical motor comprises a variable-speed electrical motor for pumping hydraulic fluid in the steering system.

7. A method according to claim 4, further comprises the steps of:

calculating a differential of a calculated error; and comparing said differential of the calculated error to an error threshold and declaring said center position useful when said differential of the calculated error is less than said error threshold for a predetermined number of consecutive iterations.

8. An apparatus for determining a new center position of a steering system installed in a vehicle, comprising:

vehicle velocity sensor means for establishing a vehicle velocity and generating a vehicle velocity signal;

steering sensor means for sensing an instantaneous steering position and generating an instantaneous steering position signal;

force estimating means for estimating a steering assist force and generating a steering assist force signal; and processor means operatively connected with said vehicle velocity and steering sensor means and said force estimating means for determining said instantaneous steering position signal when both said vehicle velocity signal exceeds a velocity threshold and said steering assist force signal is less than a force threshold, incrementing a loop counter each time said determining step is performed until said loop counter exceeds a loop counter threshold, updating the current center position with the new center position when said loop counter exceeds said loop counter threshold.

9. An apparatus according to claim 8, wherein said processor continues to filter said instantaneous steering position signal until a loop counter exceeds a loop counter threshold, afterwhich said center position becomes fixed.

10. An apparatus according to claim 8, wherein said steering assist force is related to a motor speed and a motor current supplied to a variable-speed electrical motor for pumping hydraulic fluid in the steering system and said estimate of steering assist force is calculated therefrom.

* * * * *